Figure 1:
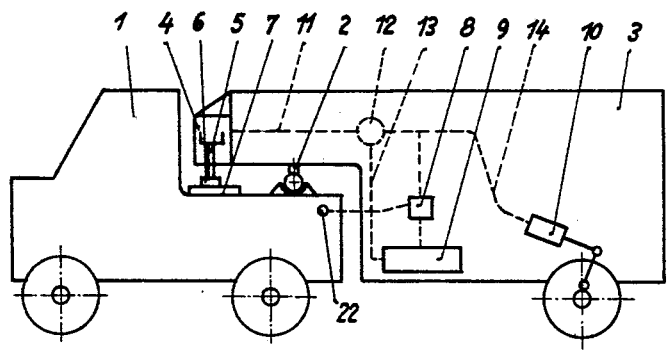

Oct. 31, 1961 H. MERZ 3,006,660
ARTICULATED VEHICLE
Filed Nov. 28, 1958 4 Sheets-Sheet 1

INVENTOR
Herbert Merz
By Lowry & Rinehart
ATTYS.

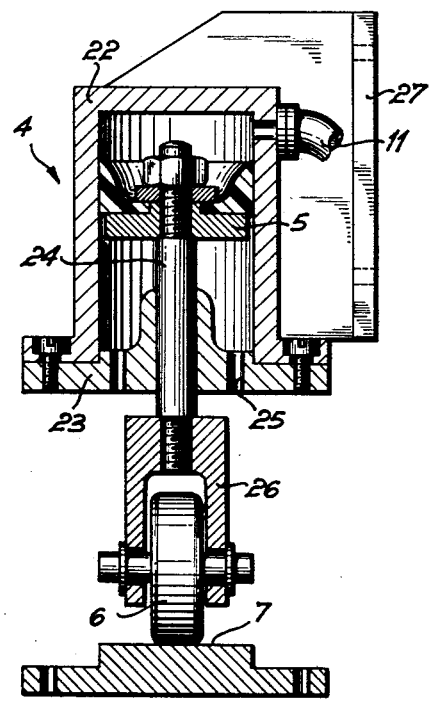
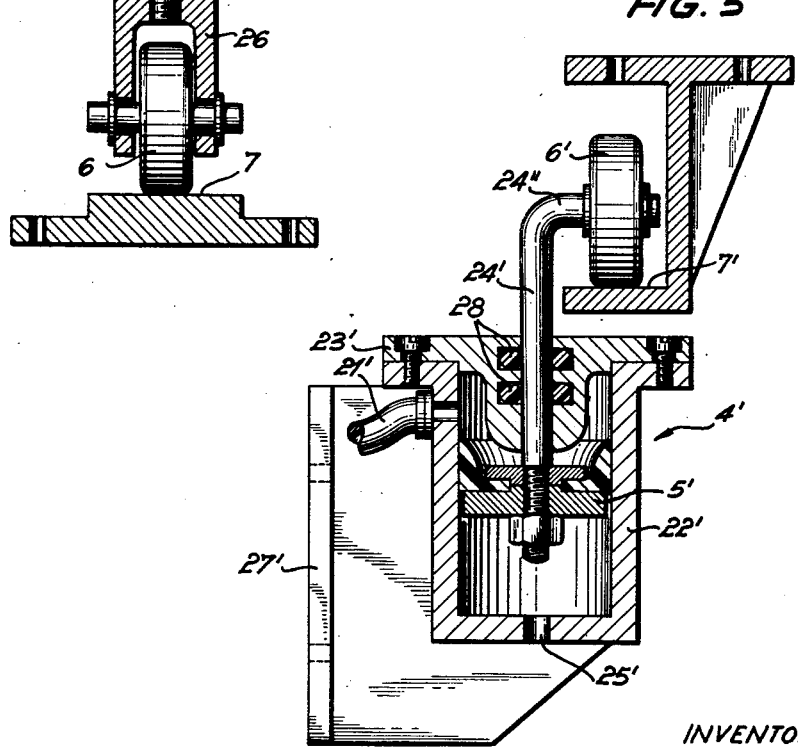

Oct. 31, 1961 H. MERZ 3,006,660
ARTICULATED VEHICLE
Filed Nov. 28, 1958 4 Sheets-Sheet 3

INVENTOR
Herbert Merz
BY
Lowry & Rinehart
ATTYS.

Oct. 31, 1961  H. MERZ  3,006,660
ARTICULATED VEHICLE

Filed Nov. 28, 1958  4 Sheets—Sheet 4

INVENTOR

Herbert Merz
By
Lowry & Rinehart

ATTYS.

United States Patent Office 3,006,660
Patented Oct. 31, 1961

3,006,660
ARTICULATED VEHICLE
Herbert Merz, 1 Am Engelbosteler Damm,
Hannover, Germany
Filed Nov. 28, 1958, Ser. No. 777,055
Claims priority, application Germany Nov. 29, 1957
6 Claims. (Cl. 280—406)

This invention relates to articulated vehicles, and more specifically to an articulated vehicle comprising a towing vehicle and a semitrailer which are cooperatively connected through the intermediary of an articulation pivot.

During the braking of such articulated vehicles it is disadvantageous that, owing to dynamic displacement, the share of the load carried by the axle of the semitrailer is greatly reduced. The wheels of the semitrailer axle can thus convey only very small braking forces to the road. The consequence of this is that high compressional forces will occur at the articulation pivot between the towing vehicle and the semitrailer or the trailer wheels will skid. Both phenomena are undesirable, since even small external forces on the towing vehicle or the semitrailer are sufficient to cause the towing vehicle and the semitrailer to be thrown out of alignment. With the known arrangements it is practically impossible for braking to take place so that tensional forces occur at the articulation pivot.

The object of the present invention is to provide an articulated vehicle in which the conditions during the braking of the vehicle are improved in such a way that the braking force conveyed by the semitrailer wheels to the road is substantially increased, so that only small compressional forces, no forces at all or even tensional forces occur at the articulation pivot.

This object is attained in accordance with the invention by the provision of an articulated vehicle which comprises a towing vehicle, a semitrailer, and a controllable displacing device cooperating with the towing vehicle and the semitrailer to alter the load distribution at the axles of said towing vehicle and said semitrailer to a desired extent so that the normal physically produced distribution of forces can be redistributed as desired.

An important feature of the invention consists in that the controllable displacing device for altering the load distribution at the axles of the towing vehicle and the semitrailer is arranged to act between the towing vehicle and the semitrailer at a point spaced from the usual articulation pivot.

Another feature of the invention consists in that the controllable displacing device for altering the load distribution at the axles of the towing vehicle and the semitrailer can be controlled so that, during braking, as the action of the brakes increases, said device causes a corresponding increase in the load on the axle of the semitrailer and so that tendency to dynamic axle load displacement is reduced, cancelled out or exceeded. This last possibility allows braking to occur with maintenance of tensional forces between the towing vehicle and the semitrailer at the articulation pivot, since an axle pressure which is as great as desired can be caused to act at the axle of the semitrailer. This result is achieved particularly readily since the displacing device is controlled in dependence on the braking action. It is particularly advantageous for said device to be controlled by the braking fluid pressure of the semitrailer.

Another feature of the invention consists in that a particularly simple construction can be attained by mounting the controllable displacing device to the towing vehicle or the semitrailer and providing on the other part of the articulated vehicle, namely the semitrailer or the towing vehicle respectively, a support surface with which said device can cooperate.

Still another feature of the invention consists in that the controllable displacing device can comprise a pressure medium cylinder or a motor driven displacing spindle. The last-mentioned construction makes control very simple, since a spring or a slipping clutch can be interposed, the sliding moment of which is adjustable and controllable.

Figure 2:
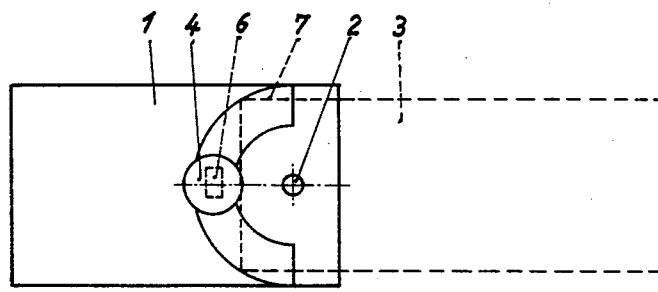
Figure 3:
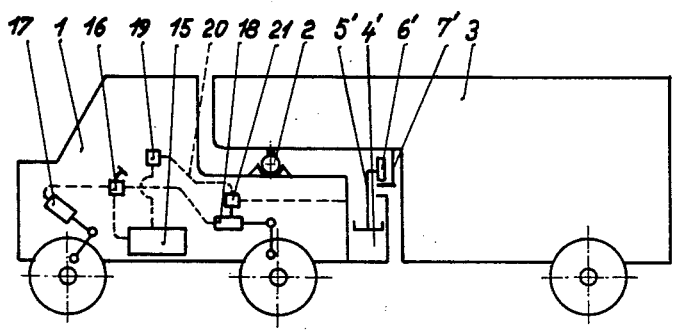
Figure 6:
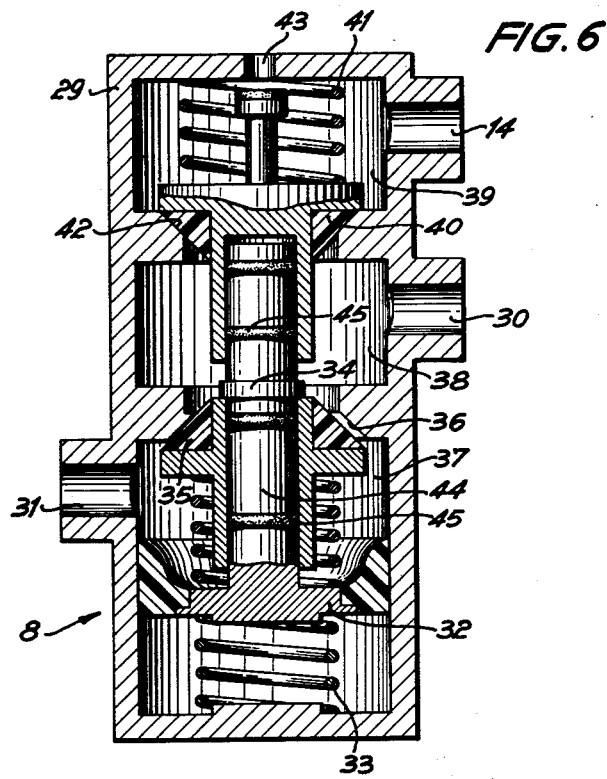
Figure 7:
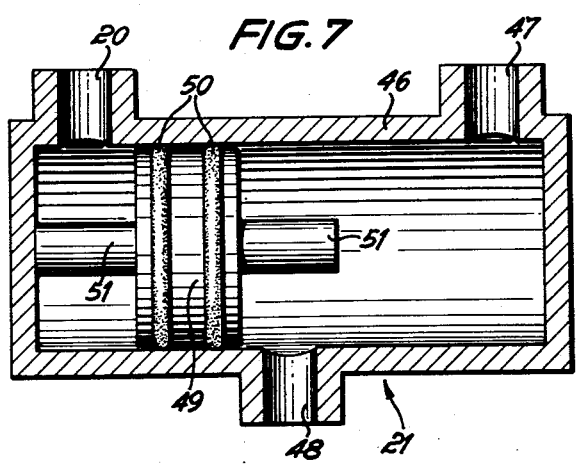
Figure 8:
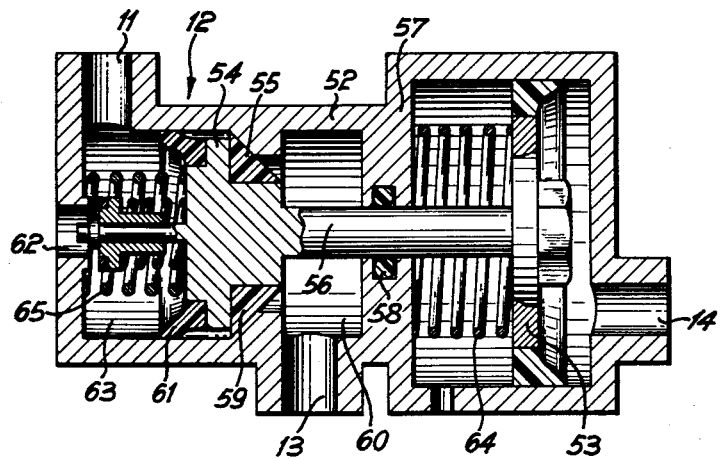

Various embodiments of the invention are possible. Two preferred embodiments of the invention will now be described by way of example and with reference to the accompanying schematic drawing, in which:

FIG. 1 is a side elevation of an articulated vehicle comprising a towing vehicle and a semitrailer;

FIG. 2 is a top plan view of the towing vehicle, the position of the semitrailer being shown in dash lines, FIG. 3 is a side elevation of another embodiment of an articulated vehicle comprising a towing vehicle and semitrailer, and FIG. 4 is an enlarged fragmentary sectional view of the pressure cylinder of FIG. 1, FIG. 5 is an enlarged fragmentary sectional view of the pull cylinder of FIG. 3, FIG. 6 is an enlarged fragmentary sectional view of the control valve of FIG. 1, FIG. 7 is an enlarged fragmentary sectional view of the two-way valve of FIG. 3, and FIG. 8 is an enlarged fragmentary sectional view of another form of valve for use with the invention shown in FIG. 1.

In the embodiment shown in FIGS. 1 and 2 of the drawing, an articulated vehicle comprises a towing vehicle 1 articulated in known manner at an articulation pivot 2 to a semitrailer 3. A pressure cylinder 4 of a controllable displacing device for causing relative displacement between the towing vehicle and the semitrailer is disposed on the semitrailer 3 forwardly of the articulating pivot 2, a piston rod 5 projecting from this cylinder and carrying a roller 6 which is supported on a support surface 7 provided on the towing vehicle 1. The pressure cylinder 4 is connected to a braking system for the semitrailer, this system comprising in known manner a brake control valve 8 connected to a storage container 9 for hydraulic fluid and also connected to a brake cylinder 10. The braking system is actuated by a brake actuating means 22 on the towing vehicle.

The pressure cylinder 4 and the brake cylinder 10 are connected by a conduit 11 and a conduit 14, between which conduits there is a regulating valve 12 connected by a conduit 13 to the storage container 9. The regulating valve 12 is controlled by the pressure in the conduit 14 and the brake cylinder 10 and, by the use of known means, produces a predetermined pressure change in the pressure cylinder 4 which is dependent on the braking pressure. The valve 12 can be so disposed that there is a predetermined pressure in the pressure cylinder 4 even when there is no braking pressure. It is also possible to dispense with the regulating valve 12 and the conduit 13.

In the embodiment shown in FIG. 3 of the drawing, a towing vehicle 1 is articulated in known manner at an articulation pivot 2 to a semitrailer 3. The displacing device for altering the load distribution at the axles comprises in the embodiment shown in FIG. 3 a pull cylinder 4' disposed on the towing vehicle 1, and a piston rod 5' projecting from this cylinder and carrying a roller 6' which is supported on a support surface 7' provided on the semitrailer rearwardly of the articulating pivot 2. The pull cylinder 4' is connected to a braking system for the towing vehicle, this system comprising a storage container 15 for hydraulic fluid, a foot brake control valve 16 connected to the storage container 15 and also connected to brake cylinders 17 and 18 for the front and rear wheels of the towing vehicle. A regulating valve and a conduit corresponding to the regulating valve 12 and the conduit 13 shown in FIG. 1 can also be provided. A hand regulating valve 19 connected by a conduit 20 to a branch valve 21 can also be provided in the operative path between the pressure cylinder 4' and the storage container 15, for applying pressure to the pressure cylinder 4'; a corresponding arrangement of the hand regulating valve 19 and the conduit 20 leading to the branch valve 21 can also be provided in the embodiment shown in FIGS. 1 and 2.

Although two preferred embodiments of the invention have been described in detail herein and illustrated in the accompanying drawing, it is to be understood that the invention is not limited to these precise embodiments, and that various changes and modifications may be effected therein without departing from the scope or spirit of the invention as defined in the appended claims. For example, the cylinder 4 or 4' need not act vertically as illustrated, but may act horizontally in the direction of travel or in any desired direction between these two extremes.

The pressure cylinder 4, as shown in FIG. 4 is connected to the conduit 11 and will be pressure-operated by it. The cylinder consists of a cylinder housing 22 and a cylinder cover 23 guiding a piston rod 24 of a piston 5. The cylinder cover has vent bores 25. Outside the cylinder, at the piston rod 24, there is secured a fork 26 in which the roller 6 is rotatably mounted. When the pressure cylinder is operated by pressure via the conduit 11, the roller 6 bears against the support face 7 which is rigidly connected to the towing vehicle 1. The cylinder housing 22 is secured to the semitrailer 3 for example by a mounting support 27.

The pull cylinder 4, as shown in FIG. 5, is connected to the conduit extending from the valve 21 and will be pressure-operated by it. The cylinder consists of a cylinder housing 22' and a cylinder cover 23' penetrated by a piston rod 24', packings 28 sealing the piston rod 24' against the cylinder cover 23'. The piston rod has an angled-off portion 24" at which the roller 6' is rotatably mounted. When the pull cylinder is pressure-operated via the conduit extending from the valve 21, the roller 6' comes to bear against the support face 7' which is rigidly connected to the semitrailer. The cylinder housing 22' has a vent bore 25' and is firmly attached to the rear part of the towing vehicle 1 for example by means of a mounting support 27'.

As shown in FIG. 6, the control valve 8 has a housing 29 which is provided with various connections. The connection of the conduit 14 connects the control valve to the brake cylinders 10 and, if necessary, to the cylinder 4 through the intermediary of the valve 12 and the conduit 11. Leading to the storage container 9 is a connection 30 and the control valve is connected to the control conduit extending from the towing vehicle by a connection 31. In FIG. 6, the control valve is shown to be in the brake releasing position. In this position the control conduit leading to the connection 31 is under full pressure which, against the action of a spring 33, holds through a piston 32 a valve cone 35 removed from its seat 36 by means of a ring 34, so that the pressure can pass via the connection 31 into the space 37 and thence through the space 38 and via the connection 30 to the storage container. Hereby the storage container 9 is filled up. At the same time, the space 38 is sealed against a space 39 by a valve cone 40 which is pressed onto its seat 42 by a spring 41, whereby a venting 43 is kept open. The connection 14 is therefore clear of pressure. When the brake of the towing machine is put into action, the pressure in the control conduit and thus in the space 37 is lowered. Thereby, under the action of the spring 33, the piston 32 will move upwards, so that the valve cone 35 is pressed onto its seat 36 and the spaces 37 and 38 are separated one from the other. At the same time, the valve cone 40 is lifted off from its seat by the piston rod 44, so that the venting 43, too, is closed. Therewith the pressure passes from the storage container 9 through the space 38 into the space 39 and thence to the brake cylinders 10 and to the valve 12 or directly to the cylinder 4. The piston rod 44 is sealed against the valve cones 35 and 40 by packings 45.

The two-way valve of FIG. 7, consists of a cylindrical housing 46 with the connection of the conduit 20, of a connection 47 leading to the brake cylinders 18 and of a connection 48 leading to the pull cylinder 4'. In the housing 46 there slides a piston 49 having packings 50 and projections 51. The valve 21 optionally clears the pressure medium passage extending either from connection 20 to 48 or from connection 47 to 48, depending in which connection prevails the higher pressure. Shown is the position for free passage from 47 to 48.

In a housing 52 of the valve 12, shown in FIG. 8, there is a large piston 53 and a small piston 54 carrying a valve cone 55. The pistons 53 and 54 are connected by a piston rod 56 which penetrates a partition wall 57 by means of a packing 58. Upon braking, the piston 53 receives pressure from the conduit 14 and thereby removes the valve cone 55 from its seat 59. Hereby the pressure passes from the storage container 9 via the conduit 13 into a space 60 and thence through a unilaterally acting packing 61 of the piston 54 into the space 63, a venting 62 having already been closed prior thereto. From the space 63 the pressure passes via the conduit 11 to the pressure cylinder 4. Depending on the tuning of the effective surfaces of the pistons 53 and 54 and of the springs 64 and 65 to one another, any desired relationship between the pressure in the conduit 14 and the pressure in the conduit 11 can be obtained. At that, the piston 54 may be larger than the piston 53. A particular advantage of the valve 12 yet consists in that the velocity of the pressure rise in the brake cylinders 10 is not slowed down, which would occur when the cylinder 4 having a large volume would be connected directly to the brake conduit 14.

The valves of FIGS. 6 to 8 are shown for example as compressed-air valves. They might also be made for vacuum or hydraulic use and then have a mode of operation corresponding thereto. It is also possible for a semi-trailer to use compressed-air plants with a filling conduit and a brake conduit operated by pressure rise, when the control valve according to FIG. 6 is prepared therefor.

The mode of operation of the valves according to FIGS. 6 to 8 is known.

Also, the device illustrated in the drawings as being a cylinder 4 or 4' need not be connected to the braking system. It may be so arranged that it can be operated at will by a hand regulating valve 19 connected via a conduit 20 to a branch valve 21 in connection with a separate storage container for hydraulic fluid, or by means of suitable automatic control devices.

I claim:

1. In an articulated vehicle train comprising a towing vehicle and a semi-trailer including articulated joint means therebetween, said towing vehicle and semi-trailer including fluid-pressure-operated braking systems imposing compressive forces at said articulated joint means resulting from braking of said vehicle train causing the accompanying tendency toward reduction of dynamic axle loading of said semi-trailer; fluid pressure displacing means connected in said semi-trailer braking system and operatively connected between said towing vehicle and semi-trailer and subject to the compressive forces of said articulated joint means, and means for activating said fluid pressure displacing means in response to the braking of said vehicle train.

2. In an articulated vehicle system as set forth in claim 1; said semi-trailer braking system including a regulating valve and pressure reservoir interposed between the semitrailer brakes and said fluid-pressure displacing means, said regulating valve being controlled by system braking pressure and controlling the control pressure fluid displaced by said fluid-pressure displacing means.

3. In an articulated vehicle train comprising a towing vehicle and a semi-trailer including articulated joint means therebetween, said towing vehicle and semi-trailer including fluid-pressure-operated braking systems imposing compressive forces at said articulated joint means resulting from braking of said vehicle train causing the accompanying tendency toward reduction of dynamic axle loading of said semi-trailer; fluid pressure displacing means operatively connected between said towing vehicle and semi-trailer and subject to the compressive forces at said articulated joint means, and means for actuating said fluid pressure displacing means in response to the braking of said vehicle train.

4. In an articulated vehicle train as set forth in claim 3; said fluid-pressure displacing means being connected in said towing vehicle braking system.

5. In an articulated vehicle train as set forth in claim 3; said fluid-pressure displacing means being interposed between said towing vehicle and said semi-trailer forwardly of said articulated joint means and subject to compression during braking.

6. In an articulated vehicle train as set forth in claim 3; said fluid-pressure displacing means being interposed between said towing vehicle and said semi-trailer rearwardly of said articulated joint means and subject to tension during braking.

References Cited in the file of this patent

UNITED STATES PATENTS

| | | |
|---|---|---|
| 2,213,221 | Johnson | Sept. 3, 1940 |
| 2,847,230 | Hendrickson et al. | Aug. 12, 1958 |